US012360543B2

(12) United States Patent
Chen et al.

(10) Patent No.: US 12,360,543 B2
(45) Date of Patent: Jul. 15, 2025

(54) REFERENCE VOLTAGE GENERATOR CIRCUIT WITH REDUCED MANUFACTURING STEPS

(71) Applicant: Richtek Technology Corporation, Hsinchu (TW)

(72) Inventors: Chien-Yu Chen, Kaohsiung (TW); Li Lin, Taipei (TW); Cheng-Kuang Lin, Nantou (TW); Yue-Hung Tang, Hsinchu (TW); Ting-Wei Liao, Taichung (TW); Shao-Hung Lu, Taoyuan (TW)

(73) Assignee: Richtek Technology Corporation, Hsinchu (TW)

( * ) Notice: Subject to any disclaimer, the term of this patent is extended or adjusted under 35 U.S.C. 154(b) by 69 days.

(21) Appl. No.: 18/488,975

(22) Filed: Oct. 17, 2023

(65) Prior Publication Data

US 2024/0248501 A1 Jul. 25, 2024

(30) Foreign Application Priority Data

Jan. 19, 2023 (TW) ................................ 112102601

(51) Int. Cl.
*G05F 3/24* (2006.01)
*G05F 1/46* (2006.01)
*G05F 1/567* (2006.01)

(52) U.S. Cl.
CPC .............. *G05F 1/567* (2013.01); *G05F 1/468* (2013.01); *G05F 3/245* (2013.01)

(58) Field of Classification Search
None
See application file for complete search history.

(56) References Cited

U.S. PATENT DOCUMENTS

| | | | | |
|---|---|---|---|---|
| 4,710,730 | A * | 12/1987 | Doyle, III | H03B 5/364 331/160 |
| 8,680,840 | B2 * | 3/2014 | Iacob | G05F 3/242 323/907 |
| 9,383,764 | B1 * | 7/2016 | Tanimoto | G05F 3/262 |
| 9,590,504 | B2 * | 3/2017 | Al-Shyoukh | G05F 3/242 |
| 9,666,574 | B1 * | 5/2017 | Lee | H10D 84/014 |
| 10,007,289 | B2 * | 6/2018 | Tanimoto | G05F 3/262 |
| 10,241,535 | B2 * | 3/2019 | Al-Shyoukh | G05F 3/262 |
| 10,585,447 | B1 * | 3/2020 | Tanimoto | G05F 3/262 |
| 11,269,368 | B2 * | 3/2022 | Al-Shyoukh | G05F 3/262 |
| 11,675,383 | B2 * | 6/2023 | Wang | G05F 3/262 323/313 |
| 11,940,825 | B2 * | 3/2024 | Quelen | H03K 3/0315 |
| 2025/0013256 | A1 * | 1/2025 | Chang | G05F 3/30 |

* cited by examiner

*Primary Examiner* — Thomas J. Hiltunen
(74) *Attorney, Agent, or Firm* — Huan-Yi Lin

(57) ABSTRACT

A reference voltage generator circuit includes: a first transistor and a second transistor, wherein the first transistor and the second transistor are coupled with each other and are located on a substrate, wherein the first transistor has a first conduction threshold voltage and a first rated voltage, wherein the second transistor has a second conduction threshold voltage and a second rated voltage, wherein the first rated voltage is higher than the second rated voltage; wherein the reference voltage generator circuit is configured to generate a bandgap reference voltage with temperature compensation according to a difference between the first conduction threshold voltage and the second conduction threshold voltage.

17 Claims, 6 Drawing Sheets

REFERENCE VOLTAGE GENERATOR CIRCUIT WITH REDUCED MANUFACTURING STEPS

CROSS REFERENCE

The present invention claims priority to TW 112102601 filed on Jan. 19, 2023.

BACKGROUND OF THE INVENTION

Field of Invention

The present invention relates to a reference voltage generator circuit; particularly, it relates to such reference voltage generator circuit manufactured with reduced manufacturing steps.

Description of Related Art

Please refer to FIG. 1A and FIG. 1B. FIG. 1A shows a schematic circuit diagram of a conventional reference voltage generator circuit. FIG. 1B shows a cross-sectional view of transistors in the conventional reference voltage generator circuit of FIG. 1A. As shown in FIG. 1A, the conventional reference voltage generator circuit 10 includes: a transistor Mn, a transistor Mfgn and a resistor R. Please refer to FIG. 1A along with FIG. 1B. The transistor Mn and the transistor Mfgn are coupled with each other and are located on a substrate 100. The transistor Mn has a first conduction threshold voltage, and the transistor Mfgn has a second conduction threshold voltage. A source of the transistor Mfgn and the resistor R are coupled with each other at an output node No. A gate of the transistor Mn is electrically connected to a gate of the transistor Mfgn. The transistor Mn and the transistor Mfgn are biased respectively by a current source Cs1 and a current source Cs2 which are correlated to each other. In this prior art, a bias current Ib1 provided by the current source Cs1 is higher than a bias current Ib2 provided by the current source Cs2. Besides, the bias current Ib1 has a specific ratio to the bias current Ib2. As shown in FIG. 1B, the gate of the transistor Mn includes: a conductive layer 101 and a dielectric layer 103, wherein the conductive layer 101 of the transistor Mn includes: a doped conductive layer 1011 and a non-doped conductive layer 1012. Likewise, the gate of the transistor Mfgn includes: a conductive layer 102 and a dielectric layer 103, wherein the conductive layer 102 of the transistor Mfgn includes: a doped conductive layer 1021 and a non-doped conductive layer 1022. The doped conductive layer 1011 of the transistor Mn is doped with P-type impurities, and the doped conductive layer 1021 of the transistor Mfgn is doped with N-type impurities, so that the first conduction threshold voltage of the transistor Mn is increased. The conventional reference voltage generator circuit 10 generates a bandgap reference voltage Vref according to a difference between the first conduction threshold voltage and the second conduction threshold voltage.

The prior art shown in FIG. 1A and FIG. 1B has the following drawbacks: it is required for the conventional reference voltage generator circuit 10 to be further doped with P-type impurities, which increases number of manufacturing steps, thus undesirably increasing manufacturing cost. Besides, because the first conduction threshold voltage of the transistor Mn is increased, the conventional reference voltage generator circuit 10 requires higher power supply voltage Vdd.

In view of the above, to overcome the drawbacks in the prior art, the present invention proposes a reference voltage generator circuit, which has advantages of: having relatively fewer required manufacturing steps, requiring relatively lower power supply voltage Vdd and having a relatively lower first conduction threshold voltage.

SUMMARY OF THE INVENTION

From one perspective, the present invention provides a reference voltage generator circuit, comprising: a first transistor and a second transistor, wherein the first transistor and the second transistor are coupled with each other and are located on a substrate, wherein the first transistor has a first conduction threshold voltage and a first rated voltage, wherein the second transistor has a second conduction threshold voltage and a second rated voltage, wherein the first rated voltage is higher than the second rated voltage; wherein the reference voltage generator circuit is configured to operably generate a bandgap reference voltage with temperature compensation according to a difference between the first conduction threshold voltage and the second conduction threshold voltage.

In one embodiment, the first transistor further has a first bandgap voltage, wherein the second transistor further has a second bandgap voltage, wherein the first conduction threshold voltage is correlated with the first bandgap voltage, wherein the second conduction threshold voltage is correlated with the second bandgap voltage.

In one embodiment, the first transistor has a same conductivity type as the second transistor.

In one embodiment, an absolute value of the first conduction threshold voltage is higher than an absolute value of the second conduction threshold voltage.

In one embodiment, each of the first transistor and the second transistor is an enhancement mode Metal Oxide Semiconductor Field Effect Transistor (MOSFET) or each of the first transistor and the second transistor is a depletion mode MOSFET.

In one embodiment, a conductivity type of a gate of the first transistor or the second transistor is different from a conductivity type of a drain and a source of the first transistor or the second transistor.

In one embodiment, an absolute value of the first conduction threshold voltage is higher than an absolute value of the second conduction threshold voltage.

In one embodiment, a power supply voltage of the reference voltage generator circuit is smaller than the first rated voltage.

In one embodiment, a power supply voltage of the reference voltage generator circuit is higher than the second rated voltage; and wherein the reference voltage generator circuit further comprises: a clamping device, which is configured to operably clamp a drain voltage of the second transistor, so that the drain voltage of the second transistor does not exceed the second rated voltage.

In one embodiment, the reference voltage generator circuit further comprises: a feedback circuit coupled to the second transistor, wherein the feedback circuit is configured to operably generate the bandgap reference voltage with temperature compensation by feedback control according to the difference between the first conduction threshold voltage and the second conduction threshold voltage.

In one embodiment, the reference voltage generator circuit further comprises: a sensing feedback resistor, wherein a source of the second transistor and the sensing feedback resistor are coupled to each other at an output node, wherein a gate of the first transistor is electrically connected to a gate of the second transistor, wherein the first transistor and the second transistor are biased respectively by a first current source and a second current source which are correlated to each other; wherein the feedback circuit includes: an amplification transistor, wherein a gate and a drain of the amplification transistor are coupled to a drain of the second transistor and the output node, respectively, so that the amplification transistor is configured to operably generate the bandgap reference voltage at the output node.

In one embodiment, the reference voltage generator circuit further comprises: a clamping transistor, which is coupled between the drain of the second transistor and the gate of the amplification transistor, wherein the clamping transistor is configured to operably clamp a drain voltage of the second transistor, so that the drain voltage of the second transistor does not exceed the second rated voltage.

In one embodiment, the clamping transistor includes a depletion mode MOSFET.

In one embodiment, the first transistor and the second transistor are biased at a sub-threshold region.

In one embodiment, the substrate further includes an operation circuit, wherein the operation circuit includes: a third transistor and a fourth transistor, wherein the third transistor and the first transistor are of a same type and are formed on the same substrate via at least one same manufacturing step, wherein the fourth transistor and the second transistor are of a same type and are formed on the same substrate via at least one same manufacturing step.

In one embodiment, the operation circuit is coupled to the reference voltage generator circuit and the operation circuit operates by receiving the bandgap reference voltage.

In one embodiment, the third transistor has a third rated voltage, wherein the fourth transistor has a fourth rated voltage, wherein the third rated voltage is higher than the fourth rated voltage, and wherein the third transistor is a power device or an input/output device.

In one embodiment, the third transistor has a third rated voltage, wherein the fourth transistor has a fourth rated voltage, wherein the third rated voltage is higher than the fourth rated voltage, and wherein the fourth transistor is a logic computation device or an analog signal processing device.

As compared to the prior art, advantages of the present invention include: that, the present invention has relatively less required manufacturing steps; and that, the present invention has a relatively lower power supply voltage Vdd and a relatively lower first conduction threshold voltage Vth1.

The objectives, technical details, features, and effects of the present invention will be better understood with regard to the detailed description of the embodiments below, with reference to the attached drawings.

DESCRIPTION OF THE PREFERRED EMBODIMENTS

Figure 1A:
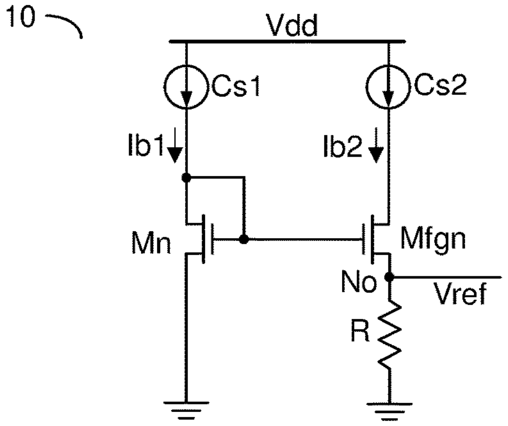
Fig. 1A (Prior Art)
FIG. 1A shows a schematic circuit diagram of a conventional reference voltage generator circuit.
Figure 1B:
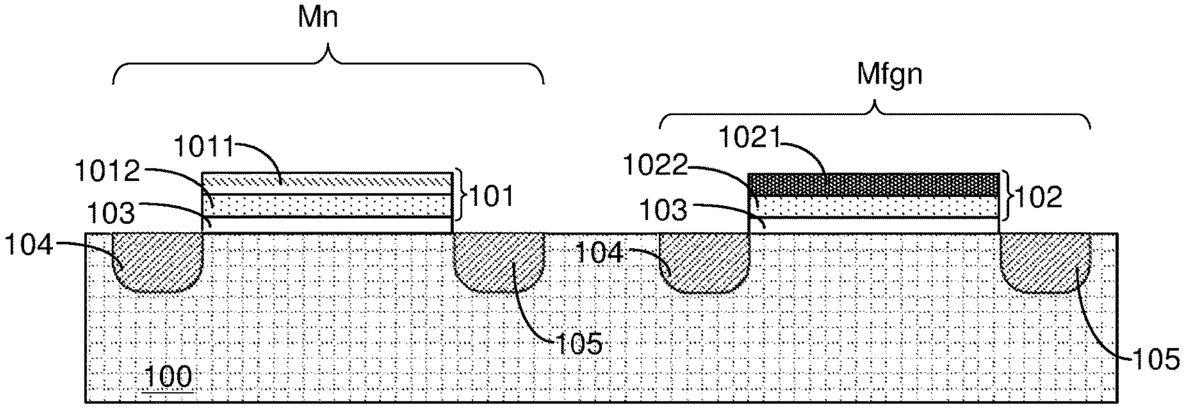
Fig. 1B (Prior Art)
FIG. 1B shows a cross-sectional view of transistors in the conventional reference voltage generator circuit of FIG. 1A.
Figure 2A:
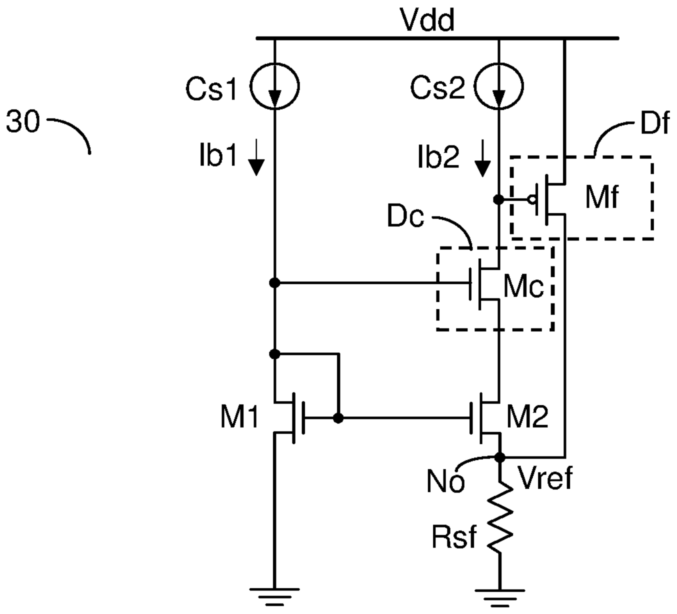
FIG. 2A shows a schematic circuit diagram of a reference voltage generator circuit according to an embodiment of the present invention.
Figure 2B:
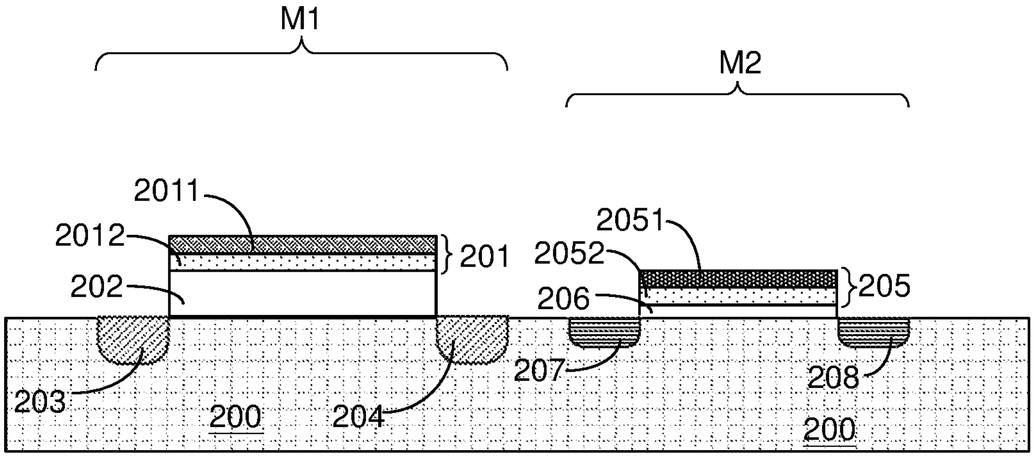
FIG. 2B shows a cross-sectional view of transistors in the reference voltage generator circuit of FIG. 2A according to an embodiment of the present invention.

The drawings illustrating circuits as referred to throughout the description of the present invention are for illustration only, to show the interrelations between the circuits and the signal waveforms, but not drawn according to actual scale of circuit sizes and signal amplitudes and frequencies. Besides, the drawings illustrating semiconductor devices as referred to throughout the description of the present invention are for illustration only, to show the interrelations among the process steps and the layers, while the shapes, thicknesses, and widths are not drawn in actual scale. For better understanding the essence of the present invention, practical implementation details will be described in the embodiments below. It should be understood that such details are not for limiting the broadest scope of the present invention Please refer to FIG. 2A along with FIG. 2B, wherein FIG. 2A shows a schematic circuit diagram of a reference voltage generator circuit according to an embodiment of the present invention, and FIG. 2B shows a cross-sectional view of transistors in the reference voltage generator circuit of FIG. 2A according to an embodiment of the present invention. The reference voltage generator circuit 30 of the present invention includes: a transistor M1, a transistor M2, a clamping device Dc, a feedback circuit Df and a sensing feedback resistor Rsf. The transistor M1 and the transistor M2 are coupled with each other and are formed and located on a same substrate 200. The transistor M1 has a first conduction threshold voltage and a first rated voltage, and the transistor M2 has a second conduction threshold voltage and a second rated voltage. In one embodiment, the first rated voltage is higher than the second rated voltage. The reference voltage generator circuit 30 is configured to operably generate a bandgap reference voltage Vref with temperature compensation according to a difference between the first conduction threshold voltage and the second conduction threshold voltage. As one having ordinary skill in the art readily understands, the aforementioned term "temperature compensation", as may be used herein, refers to: within a temperature range (e.g., −40 degrees Celsius to 125 degrees Celsius), a variation amount of the bandgap reference voltage Vref is smaller than a preset variation range. In one embodiment, the bandgap reference voltage Vref can be represented by the following equation:

$$\mathrm{Vref}=(Vth_1-Vth_2)+VT\times\ln[(Id_1/Id_2)\times((W/L)_2/(W/L)_1)]=\mathrm{dVth}+c\times VT$$

wherein Vth1 denotes the first conduction threshold voltage, Vth2 denotes the second conduction threshold voltage, VT denotes a thermal voltage, Id1 denotes a drain current flowing through the transistor M1, Id2 denotes a drain current flowing through the transistor M2, W1 denotes a width of the transistor M1, L1 denotes a length of the transistor M1, W2 denotes a width of the transistor M2, L2 denotes a length of the transistor M2, dVth denotes the difference between the first conduction threshold voltage Vth1 and the second conduction threshold voltage Vth2, and c is a coefficient related to a ratio of the drain current Id1 flowing through the transistor M1 to the drain current Id2 flowing through the transistor M2, a ratio of the width W2 to the length L2 of the transistor M2 and a ratio of the width W1 to the length L1 of the transistor M1.

The transistor M1 further has a first bandgap voltage, and the transistor M2 further has a second bandgap voltage. The first conduction threshold voltage Vth1 is correlated with the first bandgap voltage, and the second conduction threshold voltage Vth2 is correlated with the second bandgap voltage. In one embodiment, the transistor M1 has a same conductivity type as the transistor M2. For example, in one embodiment, both of the transistor M1 and the transistor M2 are N-type transistors or both are P-type transistors. In one embodiment, an absolute value of the first conduction threshold voltage Vth1 is greater than an absolute value of the second conduction threshold voltage Vth2. In one embodiment, both of the transistor M1 and the transistor M2 are enhancement mode Metal Oxide Semiconductor Field Effect Transistors (MOSFET) or both of the transistor M1 and the transistor M2 are depletion mode MOSFETs. In one embodiment, a power supply voltage Vdd of the reference voltage generator circuit 30 is smaller than the first rated voltage. As one having ordinary skill in the art readily understands, the term "rated voltage", as may be used herein, refers to: a highest voltage (particularly a drain-source voltage VDS) that a corresponding transistor can withstand. A transistor will be damaged when a certain voltage exceeds a corresponding rated voltage of such transistor.

As shown in FIG. 2A, in one embodiment, the reference voltage generator circuit 30 further comprises: the clamping device Dc, which is configured to operably clamp a drain voltage of the transistor M2 when the power supply voltage Vdd of the reference voltage generator circuit 30 is higher than the second rated voltage, so that the drain voltage of the transistor M2 does not exceed the second rated voltage. The reference voltage generator circuit 30 further comprises: a feedback circuit Df coupled to the transistor M2, wherein the feedback circuit Df is configured to operably generate the bandgap reference voltage Vref with temperature compensation by feedback control according to the difference between the first conduction threshold voltage Vth1 and the second conduction threshold voltage Vth2. In one embodiment, the reference voltage generator circuit 30 further comprises: a sensing feedback resistor Rsf. In one embodiment, a source of the transistor M2 and the sensing feedback resistor Rsf are coupled to each other at an output node No. A gate of the transistor M1 is electrically connected to a gate of the transistor M2 (i.e., the gate of the transistor M1 and a drain of the transistor M1 are coupled to each other, so as to constitute a diode connected transistor, which is further coupled to the transistor M2). The transistor M1 and the transistor M2 are biased respectively by a current source Cs1 and a current source Cs2 which are correlated to each other. In one embodiment, a bias current Ib1 provided by the current source Cs1 is higher than a bias current Ib2 provided by the current source Cs2. Besides, the bias current Ib1 has a constant ratio (for example but not limited to 1) to the bias current Ib2. In this case, the bias current Ib1 is actually the aforementioned drain current Id1, and the bias current Ib2 is actually the aforementioned drain current Id2.

Still referring to FIG. 2A, in one embodiment, the feedback circuit Df includes: an amplification transistor Mf. In one embodiment, a conductivity type of the amplification transistor Mf is different from a conductivity type of the transistor M1 and a conductivity type of the transistor M2. A gate and a drain of the amplification transistor Mf are coupled to a drain of the transistor M2 and the output node No, respectively, so that the bandgap reference voltage Vref is generated at the output node No. In one embodiment, the reference voltage generator circuit 30 further comprises: a clamping transistor Mc, which is coupled between the drain of the transistor M2 and the gate of the amplification transistor Mf, wherein the clamping transistor Mc is configured to operably clamp a drain voltage of the transistor M2, so that the drain voltage of the transistor M2 does not exceed the second rated voltage. In one embodiment, the clamping transistor Mc includes a depletion mode MOSFET. In one embodiment, the transistor M1 and the transistor M2 are biased at a sub-threshold region.

As shown in FIG. 2B, the gate of the transistor M1 includes: a conductive layer 201 and a dielectric layer 202, wherein the conductive layer 201 of the transistor M1 includes: a doped conductive layer 2011 and a non-doped conductive layer 2012. Likewise, the gate of the transistor M2 includes: a conductive layer 205 and a dielectric layer 206, and the conductive layer 205 of the transistor M2 includes: a doped conductive layer 2051 and a non-doped conductive layer 2052. In one embodiment, the first rated voltage of the transistor M1 is higher than the second rated voltage of the transistor M2 because of at least one of the following reasons: respective depth of the source 203 and the drain 204 of the transistor M1 is deeper than respective depth of the source 207 and the drain 208 of the transistor M2, a thickness of the dielectric layer 202 of the transistor M1 is thicker than a thickness of the dielectric layer 206 of the transistor M2, and/or a channel length between the source 203 and the drain 204 of the transistor M1 is longer than a channel length between the source 207 and the drain 208 of the transistor M2.

Figure 2C:
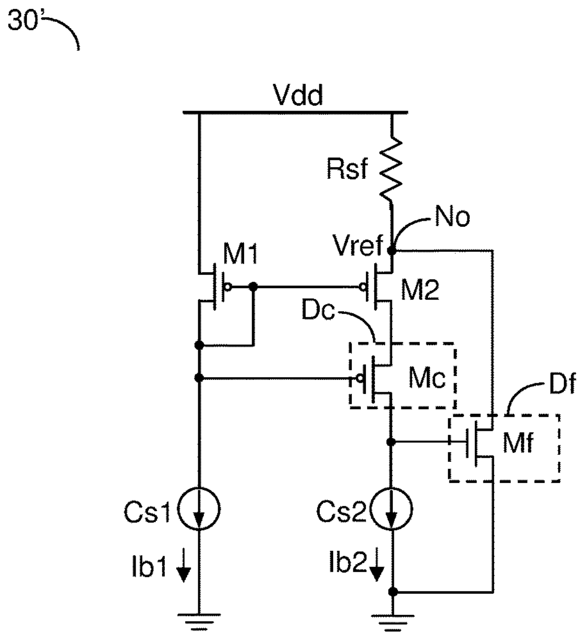
FIG. 2C shows a schematic circuit diagram of a reference voltage generator circuit according to another embodiment of the present invention.

FIG. 2C shows a schematic circuit diagram of a reference voltage generator circuit according to another embodiment of the present invention. The reference voltage generator circuit 30' in this embodiment shown in FIG. 2C is similar to the reference voltage generator circuit 30 in the embodiment shown in FIG. 2A, but is different in that: the transistor M1, the transistor M2 and the clamping transistor Mc in the embodiment shown in FIG. 2A are implemented using N-type MOS transistors, and the amplification transistor Mf in the embodiment shown in FIG. 2A is implemented using a P-type MOS transistor. However, the transistor M1, the transistor M2 and the clamping transistor Mc in this embodiment shown in FIG. 2C are implemented using P-type MOS transistors, and the amplification transistor Mf in this embodiment shown in FIG. 2C is implemented using an N-type MOS transistor. As a result, in this case, in a configuration of the reference voltage generator circuit 30', all components and devices of this embodiment shown in FIG. 2C are arranged in opposite schematic drawing positions, as compared to all components and devices in the embodiment shown in FIG. 2A, so the details thereof are not redundantly repeated here.

Figure 3:
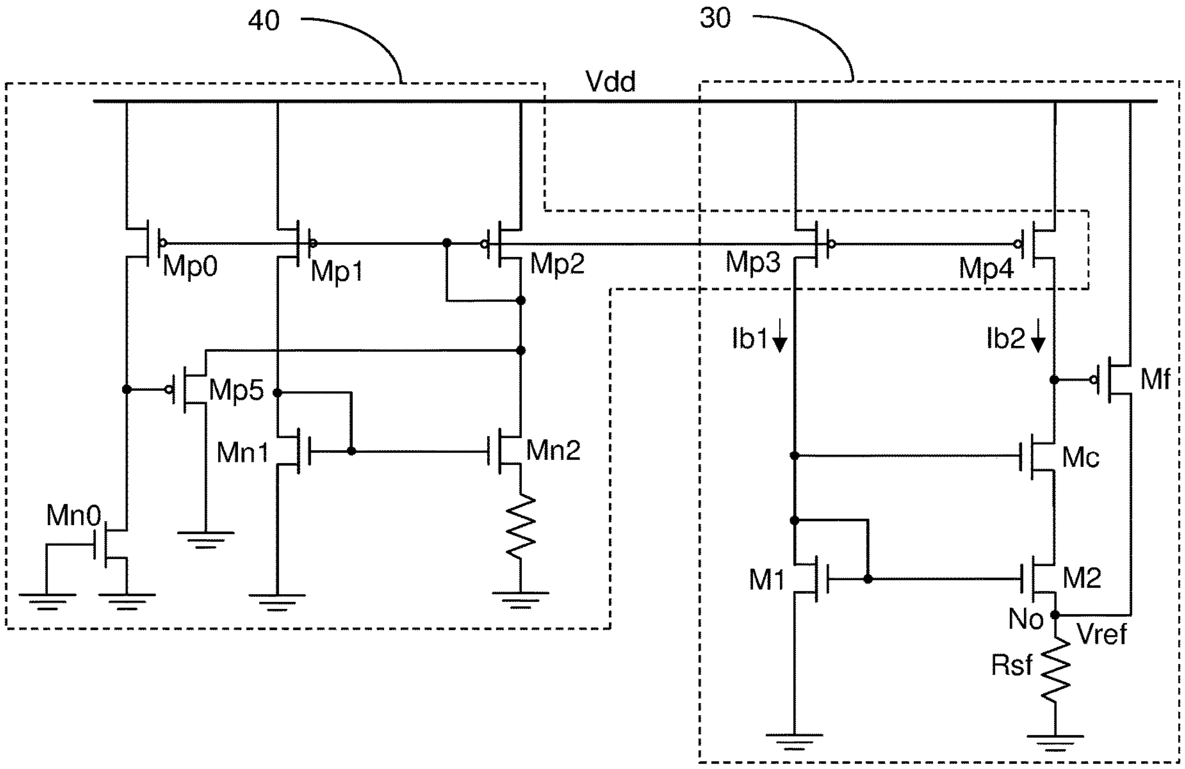
FIG. 3 shows a schematic circuit diagram of a current source circuit in a reference voltage generator circuit according to another embodiment of the present invention.

FIG. 3 shows a schematic circuit diagram of a current source circuit in a reference voltage generator circuit according to another embodiment of the present invention. The reference voltage generator circuit 30 in this embodiment shown in FIG. 3 is similar to the reference voltage generator circuit 30 in the embodiment shown in FIG. 2A, so the details thereof are not redundantly repeated here. The current source circuit 40 is an exemplary embodiment of the current source Cs1 and the current source Cs2 of FIG. 2A, which is well known to those skilled in the art, so the details thereof are not redundantly explained here.

Figure 4:
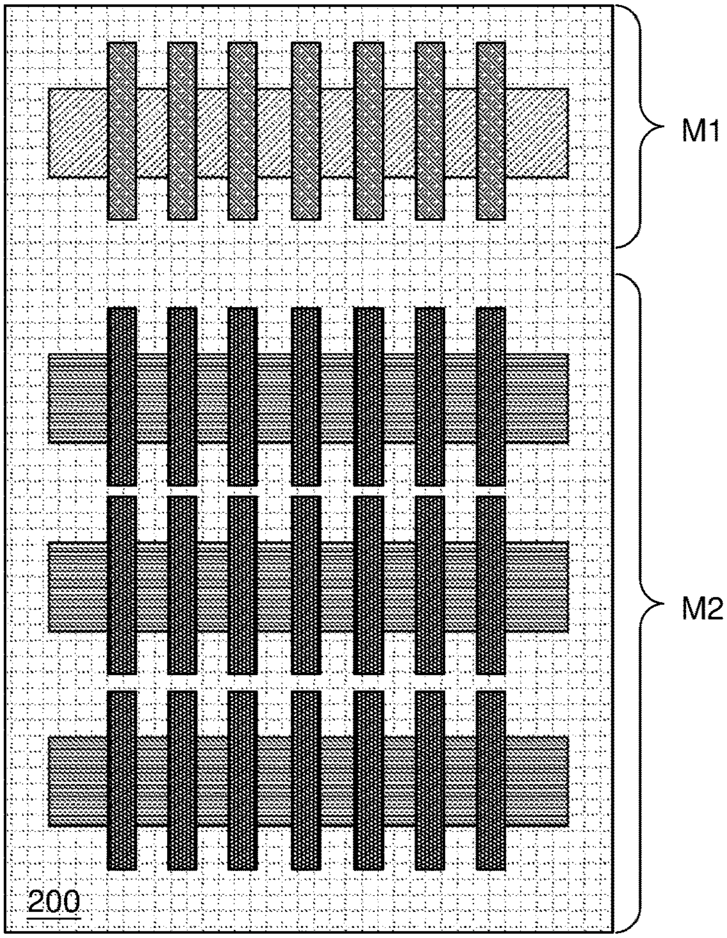
FIG. 4 shows a schematic representation of a layout top view of transistors in the reference voltage generator circuit according to an embodiment of the present invention.

FIG. 4 shows a schematic representation of a layout top view of transistors in the reference voltage generator circuit according to an embodiment of the present invention. FIG. 4 shows a s a top view layout diagram of the transistor M1 and the transistor M2 which are located on the substrate 200. In one embodiment, as shown in FIG. 4, each of the transistor M1 and the transistor M2 can be formed by duplicating and mirroring a respective corresponding unit transistor which has a predetermined width and a predetermined length, so that the size matching between the transistor M1 and the transistor M2 can be optimized.

Figure 5A:
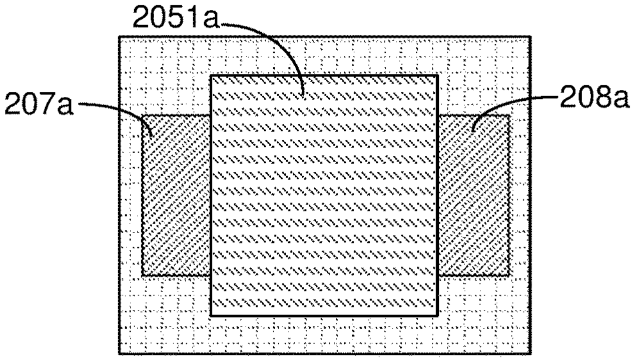
FIG. 5A shows a schematic circuit diagram and a top view depicting a transistor of FIG. 2A in a reference voltage generator circuit which is implemented as a flipped gate transistor according to an embodiment of the present invention.
Figure 5A:
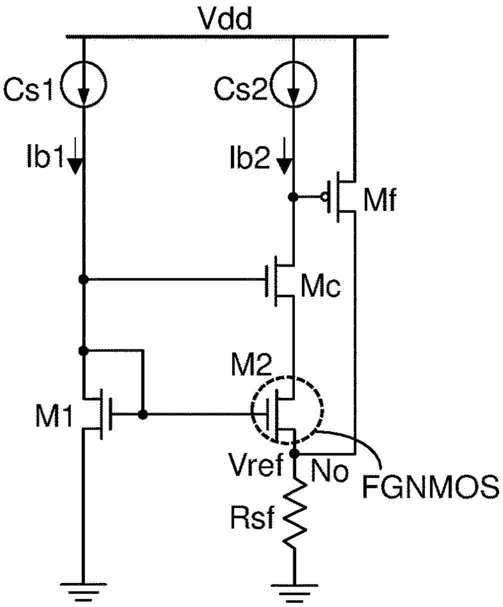

FIG. 5A shows a schematic circuit diagram and a top view layout diagram depicting a transistor M2 implemented as a flipped gate transistor of FIG. 2A in a reference voltage generator circuit according to an embodiment of the present invention. This embodiment is an exemplary embodiment. As shown in right portion of FIG. 5A, in this embodiment, the transistor M2 is implemented as a flipped gate N-type MOS (FGNMOS) transistor. It should be understood that the implementation of the transistor M2 as the FGNMOS transistor in the above-mentioned preferred embodiment is only an illustrative example, but not for limiting the broadest scope of the present invention. In other embodiments, it is also practicable and within the broadest scope of the present invention that any one of the transistor M2 and the transistor M1 can be implemented as a flipped gate MOS transistor. As shown in left portion of FIG. 5A, a doped conductive layer 2051*a* of a gate of the transistor M2 which is implemented as a flipped gate MOS transistor has P conductivity type, and a source 207*a* and a drain 208*a* of the transistor M2 have N conductivity type. In one embodiment, a second conduction threshold voltage of the transistor M2 which is implemented as a flipped gate MOS transistor of FIG. 5A will be slightly higher than a second conduction threshold voltage of the transistor M2 of FIG. 2A, but the second conduction threshold voltage of the transistor M2 which is implemented as a flipped gate MOS transistor of FIG. 5A is still lower than the first conduction threshold voltage of the transistor M1.

Figure 5B:
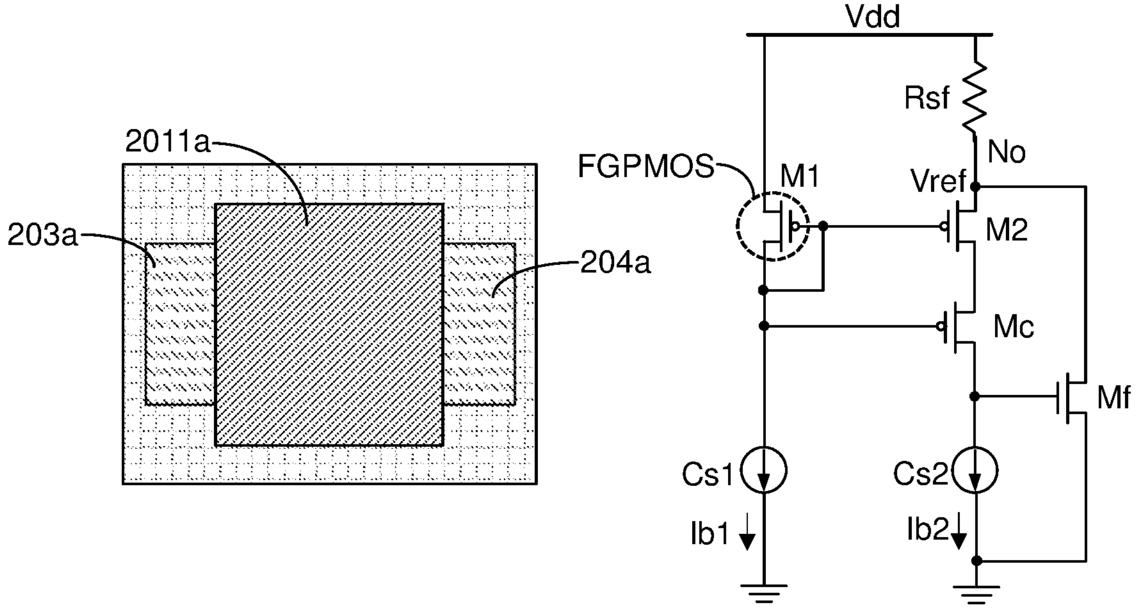
FIG. 5B shows a schematic circuit diagram and a top view depicting another transistor of FIG. 2A in a reference voltage generator circuit which is implemented as a flipped gate transistor according to an embodiment of the present invention.

FIG. 5B shows a schematic circuit diagram and a top view layout diagram depicting another transistor M1 which is implemented as a flipped gate transistor of FIG. 2A in a reference voltage generator circuit according to an embodiment of the present invention. This embodiment is an exemplary embodiment. As shown in right portion of FIG. 5B, in this embodiment, the transistor M1 is implemented as a flipped gate P-type MOS (FGPMOS) transistor. It should be understood that the implementation of the transistor M1 as the FGNMOS transistor in the above-mentioned preferred embodiment is only an illustrative example, but not for limiting the broadest scope of the present invention. In other embodiments, it is also practicable and within the broadest scope of the present invention that any one of the transistor M2 and the transistor M1 can be implemented as a flipped gate MOS transistor. As shown in left portion of FIG. 5B, a doped conductive layer 2011*a* of a gate of the transistor M1 which is implemented as a flipped gate MOS transistor has N conductivity type, and a source 203*a* and a drain 204*a* of the transistor M1 have P conductivity type. As shown in FIG. 5A and FIG. 5B, in one embodiment, a conductivity type of a gate of the transistor M1 or the transistor M2 is different from a conductivity type of a drain and a source of the transistor M1 or the transistor M2 respectively. For example, each of the drain and the source has N conductivity type, and the gate has P conductivity type, or vice versa. In one embodiment, an absolute value of the first conduction threshold voltage is higher than an absolute value of the second conduction threshold voltage.

Figure 6:
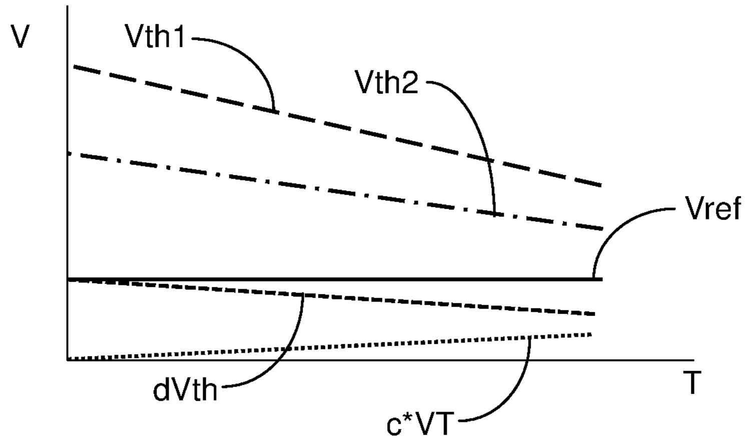
FIG. 6 shows a relationship diagram depicting temperature dependence curves of a first conduction threshold voltage, a second conduction threshold voltage, a bandgap reference voltage, a bandgap reference voltage, a difference between the first conduction threshold voltage and the second conduction threshold voltage and a positive temperature coefficient according to an embodiment of the present invention.

FIG. 6 shows a relationship diagram depicting temperature dependence curves of a first conduction threshold voltage, a second conduction threshold voltage, a bandgap reference voltage, a bandgap reference voltage, a difference between the first conduction threshold voltage and the second conduction threshold voltage and a thermal voltage having a positive temperature coefficient according to an embodiment of the present invention. The first conduction threshold voltage Vth1, the second conduction threshold voltage Vth2, the bandgap reference voltage Vref, the bandgap reference voltage, the difference dVth between the first conduction threshold voltage Vth1 and the second conduction threshold voltage Vth2 and the thermal voltage c*VT having positive temperature coefficient are illustrated in FIG. 6. As shown in FIG. 6, in one embodiment, because an absolute value of a temperature coefficient of the first conduction threshold voltage Vth1 is higher than an absolute value of a temperature coefficient of the second conduction threshold voltage Vth2, the difference dVth between the first conduction threshold voltage Vth1 and the second conduction threshold voltage Vth2 has a negative temperature coefficient. Moreover, because c*VT denotes the thermal voltage with the positive temperature coefficient, the bandgap voltage reference voltage Vref obtained by summing the difference dVth having the negative temperature coefficient plus the thermal voltage c*VT having positive temperature coefficient will have a resultant temperature coefficient close to zero or is equal to zero.

Figure 7:
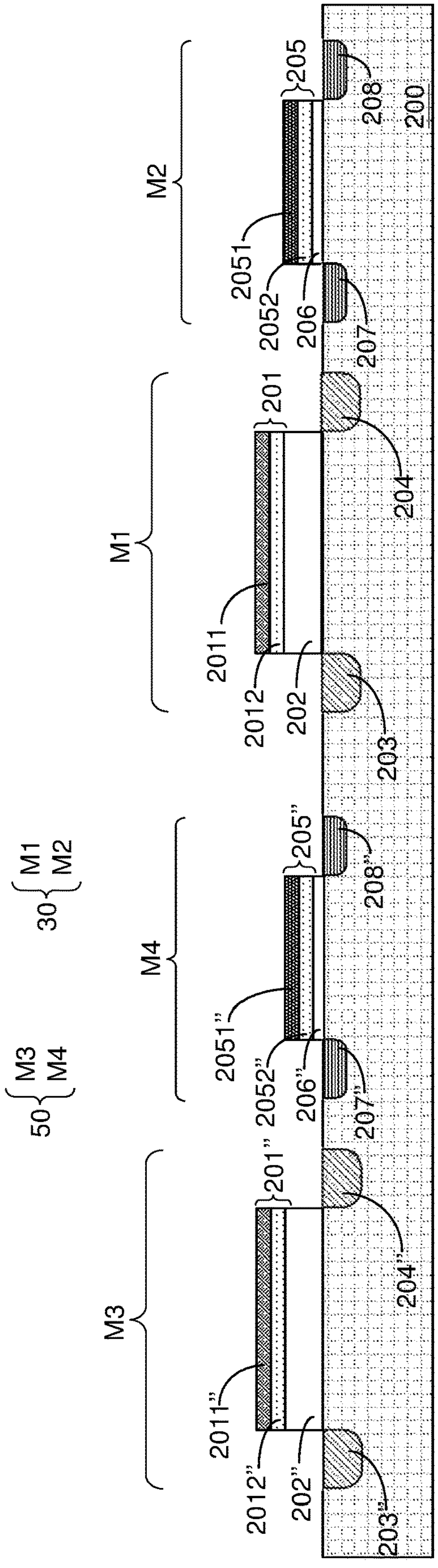
FIG. 7 shows a cross-sectional view depicting transistors in a reference voltage generator circuit and transistors in an operation circuit which are formed via a same manufacturing step according to an embodiment of the present invention.

FIG. 7 shows a cross-sectional view depicting transistors in a reference voltage generator circuit and transistors in an operation circuit which are formed via a same manufacturing step according to an embodiment of the present invention. As shown in FIG. 7, the substrate 200 further includes an operation circuit 50, wherein the operation circuit 50 includes: a transistor M3 and a transistor M4. The transistor M3 is the same type transistor as the transistor M1 and both are formed on the same substrate 200 via at least one same manufacturing step. The transistor M4 is the same type transistor as the transistor M2, and both are formed on the same substrate 200 via at least one same manufacturing step. As a result, in this case, the manufacturing steps can be desirably reduced. The more the same manufacturing steps for forming the transistor M3 and the transistor M1, the more the manufacturing steps can be desirably reduced. Likewise, the more the same manufacturing steps for forming the transistor M4 and the transistor M2, the more the manufacturing steps can be desirably reduced.

The transistor M3 and the transistor M1 can be formed on the same substrate 200 via for example plural same manufacturing steps, so that the resultant transistor M3 and the resultant transistor M1 will become transistors of a same type. Likewise, the transistor M4 and the transistor M2 can be formed on the same substrate 200 via for example plural same manufacturing steps, so that the resultant transistor M4 and the resultant transistor M2 will become transistors of a same type. As one having ordinary skill in the art readily understands, the term "transistors of a same type", as may be used herein, refers to: transistors having same conductivity type. In one embodiment, the transistor M3 and the transistor M1 can have a same electrical characteristic. For example, the third rated voltage of the transistor M3 has a same voltage level as the first rated voltage of the transistor M1. In one embodiment, the transistor M4 and the transistor M2 can have a same electrical characteristic. For example, the fourth rated voltage of the transistor M4 has a same voltage level as the second rated voltage of the transistor M2.

In light of above, as compared to the prior art reference voltage generator circuit, advantages of the reference voltage generator circuit of the present invention include that the present invention requires fewer manufacturing steps, and that the present invention can operate with a lower power supply voltage Vdd and has a relatively lower first conduction threshold voltage Vth1. In other words, the reference voltage generator circuit of the present invention is formed by the pre-existing same type of transistors which are fabricated by pre-existing manufacturing steps for a pre-existing operation circuit formed on the very same substrate. As a consequence, in this case, manufacturing cost for the present invention can be effectively reduced.

According to the present invention, in one embodiment, under different temperature ranges, the reference voltage generator circuit of the present invention can provide a precise and stable bandgap reference voltage Vref to the operation circuit, particularly when the operation circuit is applied in an analog and digital circuit or in a communication circuit. For example, in the embodiment of an operation circuit 50 shown in FIG. 7, the operation circuit 50 is coupled to the reference voltage generator circuit 30 and the operation circuit 50 is configured to operate by receiving the bandgap reference voltage Vref generated by the reference voltage generator circuit 30. Note that, in general, the bandgap reference voltage Vref generated by the reference voltage generator circuit 30 is lower than 5V.

According to the present invention, for example, in the embodiment of an operation circuit 50 shown in FIG. 7, the transistor M3 of the operation circuit 50 has a third rated voltage, and the transistor M4 of the operation circuit 50 has a fourth rated voltage, wherein the third rated voltage is higher than the fourth rated voltage. And, in one embodiment, the transistor M3 is for example a power device or an input/output (I/O) device. For example, the third rated voltage of the transistor M3 is higher than for example 5V, and the fourth rated voltage of the transistor M4 is not higher than 5V. However, in other embodiments, it is also practicable and within the broadest scope of the present invention that the third rated voltage of the transistor M3 is lower than 5V, for example but not limited to, 1.8V, and the fourth rated voltage is, for example but not limited to, 1.3V.

According to the present invention, for example, in the embodiment of an operation circuit 50 shown in FIG. 7, the transistor M3 of the operation circuit 50 has a third rated voltage, and the transistor M4 of the operation circuit 50 has a fourth rated voltage, wherein the third rated voltage is higher than the fourth rated voltage. And, in one embodiment, the transistor M4 is for example a logic computation device or an analog signal processing device. In this case, in one embodiment, the third rated voltage of the transistor M3 is higher than for example 5V, and the fourth rated voltage of the transistor M4 is not higher than 5V.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the the following claims and their equivalents.

What is claimed is:

1. A reference voltage generator circuit, comprising:

a first transistor and a second transistor, wherein the first transistor and the second transistor are coupled with each other and are located on a substrate, wherein the first transistor has a first conduction threshold voltage and a first rated voltage, wherein the second transistor has a second conduction threshold voltage and a second rated voltage, wherein the first rated voltage is higher than the second rated voltage; and a clamping device, which is configured to operably clamp a drain voltage of the second transistor, so that the drain voltage of the second transistor does not exceed the second rated voltage;

wherein the reference voltage generator circuit is configured to operably generate a bandgap reference voltage with temperature compensation according to a difference between the first conduction threshold voltage and the second conduction threshold voltage;

wherein a power supply voltage of the reference voltage generator circuit is higher than the second rated voltage.

2. The reference voltage generator circuit of claim 1, wherein the first transistor further has a first bandgap voltage, wherein the second transistor further has a second bandgap voltage, wherein the first conduction threshold voltage is correlated with the first bandgap voltage, wherein the second conduction threshold voltage is correlated with the second bandgap voltage.

3. The reference voltage generator circuit of claim 1, wherein the first transistor has a same conductivity type as the second transistor.

4. The reference voltage generator circuit of claim 3, wherein an absolute value of the first conduction threshold voltage is higher than an absolute value of the second conduction threshold voltage.

5. The reference voltage generator circuit of claim 3, wherein each of the first transistor and the second transistor is an enhancement mode Metal Oxide Semiconductor Field Effect Transistor (MOSFET) or each of the first transistor and the second transistor is a depletion mode MOSFET.

6. The reference voltage generator circuit of claim 3, wherein a conductivity type of a gate of the first transistor or the second transistor is different from a conductivity type of a drain and a source of the first transistor or the second transistor.

7. The reference voltage generator circuit of claim 6, wherein an absolute value of the first conduction threshold voltage is higher than an absolute value of the second conduction threshold voltage.

8. The reference voltage generator circuit of claim 1, wherein a power supply voltage of the reference voltage generator circuit is smaller than the first rated voltage.

9. The reference voltage generator circuit of claim 4, further comprising:

a feedback circuit coupled to the second transistor, wherein the feedback circuit is configured to operably generate the bandgap reference voltage with temperature compensation by feedback control according to the difference between the first conduction threshold voltage and the second conduction threshold voltage.

10. The reference voltage generator circuit of claim 9, further comprising:

a sensing feedback resistor, wherein a source of the second transistor and the sensing feedback resistor are coupled to each other at an output node, wherein a gate of the first transistor is electrically connected to a gate of the second transistor, wherein the first transistor and the second transistor are biased respectively by a first current source and a second current source which are correlated to each other wherein the feedback circuit includes:

an amplification transistor, wherein a gate and a drain of the amplification transistor are coupled to a drain of the second transistor and the output node, respectively, so that the amplification transistor is configured to operably generate the bandgap reference voltage at the output node.

11. The reference voltage generator circuit of claim 10, wherein the clamping device is a clamping transistor, which is coupled between the drain of the second transistor and the gate of the amplification transistor.

12. The reference voltage generator circuit of claim 11, wherein the clamping transistor includes a depletion mode MOSFET.

13. The reference voltage generator circuit of claim 1, wherein the first transistor and the second transistor are biased at a sub-threshold region.

14. The reference voltage generator circuit of claim 1, wherein the substrate further includes an operation circuit, wherein the operation circuit includes:

a third transistor and a fourth transistor, wherein the third transistor and the first transistor are of a same type and are formed on the same substrate via at least one same manufacturing step, wherein the fourth transistor and the second transistor are of a same type and are formed on the same substrate via at least one same manufacturing step.

15. The reference voltage generator circuit of claim 14, wherein the operation circuit is coupled to the reference voltage generator circuit and the operation circuit operates by receiving the bandgap reference voltage.

16. The reference voltage generator circuit of claim 14, wherein the third transistor has a third rated voltage, wherein the fourth transistor has a fourth rated voltage, wherein the third rated voltage is higher than the fourth rated voltage, and wherein the third transistor is a power device or an input/output device.

17. The reference voltage generator circuit of claim 14, wherein the third transistor has a third rated voltage, wherein the fourth transistor has a fourth rated voltage, wherein the third rated voltage is higher than the fourth rated voltage, and wherein the fourth transistor is a logic computation device or an analog signal processing device.

* * * * *